(12) United States Patent
Ota et al.

(10) Patent No.: US 12,282,224 B2
(45) Date of Patent: Apr. 22, 2025

(54) BACKLIGHT AND DISPLAY DEVICE

(71) Applicant: Japan Display Inc., Tokyo (JP)

(72) Inventors: Takashi Ota, Tokyo (JP); Michihide Shibata, Tokyo (JP); Nobuyuki Suzuki, Tokyo (JP); Masafumi Okada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/796,391

(22) Filed: Aug. 7, 2024

(65) Prior Publication Data

US 2025/0068011 A1 Feb. 27, 2025

(30) Foreign Application Priority Data

Aug. 23, 2023 (JP) .................... 2023-135276

(51) Int. Cl.
*G02F 1/1335* (2006.01)
*G02F 1/13357* (2006.01)

(52) U.S. Cl.
CPC .. *G02F 1/133607* (2021.01); *G02F 1/133603* (2013.01); *G02F 1/133605* (2013.01)

(58) Field of Classification Search
CPC ......... G02F 1/133603; G02F 1/133607; G02F 1/133605; F21V 5/007; F21V 5/008; G02B 19/0066; G02B 3/005; G02B 3/0062

See application file for complete search history.

(56) References Cited

U.S. PATENT DOCUMENTS

| | | | | |
|---|---|---|---|---|
| 5,612,821 A | * | 3/1997 | Schmutz | G02B 19/0066 359/619 |
| 2009/0268128 A1 | * | 10/2009 | Yamada | G02F 1/133606 349/67 |
| 2009/0284954 A1 | * | 11/2009 | Yamada | G02F 1/133606 359/623 |
| 2017/0329133 A1 | * | 11/2017 | Nambara | B60K 35/00 |
| 2021/0311362 A1 | | 10/2021 | Kobashi et al. | |

FOREIGN PATENT DOCUMENTS

| | | | | | |
|---|---|---|---|---|---|
| CN | 105700227 A | * | 6/2016 | ....... | G02F 1/133512 |
| CN | 113917579 A | * | 1/2022 | | |
| JP | 2021-162748 A | | 10/2021 | | |

* cited by examiner

*Primary Examiner* — Erin Kryukova
(74) *Attorney, Agent, or Firm* — Michael Best & Friedrich LLP

(57) ABSTRACT

A backlight includes: a light source capable of emitting light spreading in first and second directions perpendicular to each other, from an optical axis; a first cylindrical lens that refracts and brings the light closer along the first direction to the optical axis, the first cylindrical lens overlapping with the light source in a third direction perpendicular to the first and second directions; a second cylindrical lens that refracts and brings the light even closer along the first direction to the optical axis, the second cylindrical lens overlapping with the light source and the first cylindrical lens in the third direction; and a reflector that reflects and brings the light closer along the second direction to the optical axis, the reflector being positioned between the first cylindrical lens and the second cylindrical lens in the third direction, the reflector avoiding overlap with the light source.

12 Claims, 4 Drawing Sheets

BACKLIGHT AND DISPLAY DEVICE

CROSS-REFERENCE TO RELATED APPLICATION

The present application claims priority from Japanese patent application JP2023-135276 filed on Aug. 23, 2023, the contents of which are hereby incorporated by reference into this application.

BACKGROUND

1. Field

The present disclosure relates to a backlight and a display device.

2. Description of the Related Art

Backlights used in non-self-luminous display devices ideally emit parallel light, but light emitted from a light source tends to spread (JP 2021-162748 A).

To reduce a spreading angle of the light, a spherical lens can be used, though it is not essential for linearly concentrating the light. Additionally, the spherical lens complicates a mold shape for injection molding, requiring many processing steps.

SUMMARY

The present disclosure aims to narrow a light distribution angle without using a spherical lens.

A backlight includes: a light source capable of emitting light spreading in a first direction and a second direction perpendicular to each other, from an optical axis; a first cylindrical lens that refracts and brings the light closer along the first direction to the optical axis, the first cylindrical lens overlapping with the light source in a third direction perpendicular to the first direction and the second direction; a second cylindrical lens that refracts and brings the light even closer along the first direction to the optical axis, the second cylindrical lens overlapping with the light source and the first cylindrical lens in the third direction; and a reflector that reflects and brings the light closer along the second direction to the optical axis, the reflector being positioned between the first cylindrical lens and the second cylindrical lens in the third direction, the reflector avoiding overlap with the light source.

DETAILED DESCRIPTION

Figure 1:
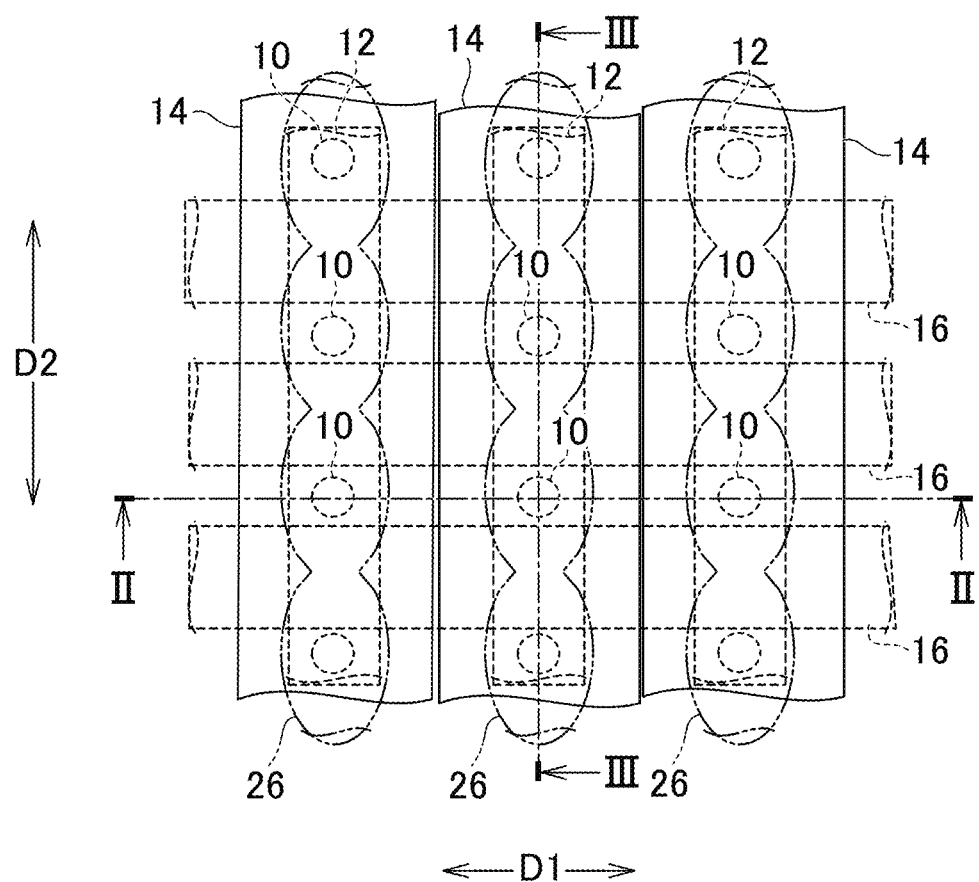
FIG. 1 is a partial plan view of a backlight according to an embodiment.

Hereinafter, some embodiments will be described with reference to the drawings. Here, the invention can be embodied according to various aspects without departing from the gist of the invention and is not construed as being limited to the content described in the embodiments exemplified below.

The drawings are further schematically illustrated in widths, thicknesses, shapes, and the like of units than actual forms to further clarify description in some cases but are merely examples and do not limit interpretation of the invention. In the present specification and the drawings, the same reference numerals are given to elements having the same functions described in the previously described drawings, and the repeated description will be omitted.

Further, in the detailed description, "on" or "under" in definition of positional relations of certain constituents, and other constituents includes not only a case in which a constituent is located just on or just under a certain constituent but also a case in which another constituent is interposed between constituents unless otherwise mentioned.

Figure 2:
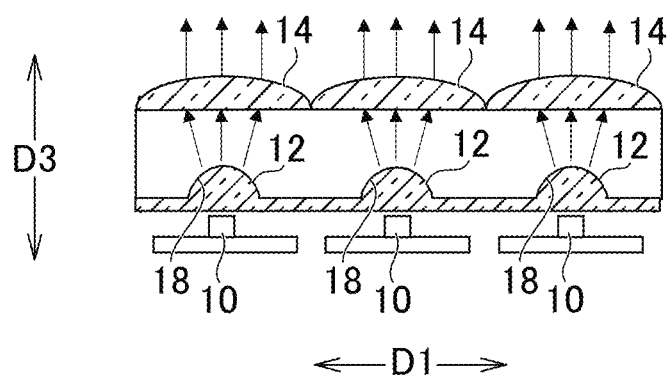
FIG. 2 is a sectional view taken along line II-II of the backlight in FIG. 1.
Figure 3:
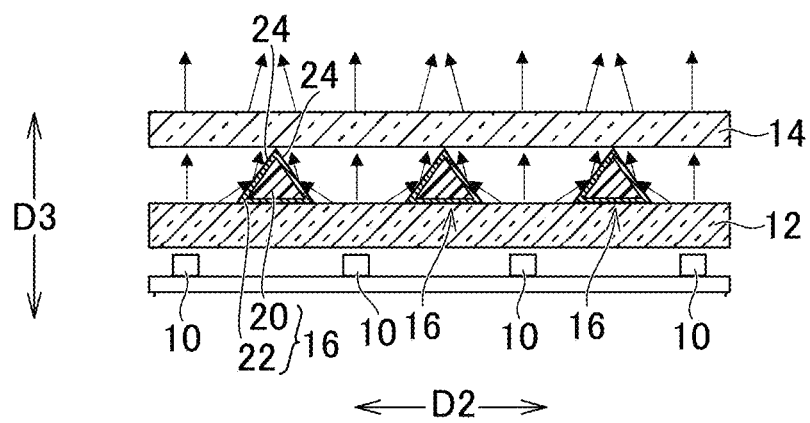
FIG. 3 is a sectional view taken along line III-III of the backlight in FIG. 1.

FIG. 1 is a partial plan view of a backlight according to an embodiment. FIG. 2 is a sectional view taken along line II-II of the backlight in FIG. 1. FIG. 3 is a sectional view taken along line III-III of the backlight in FIG. 1.

[Light Source]

The backlight includes a light source 10 (e.g., light emitting diode). The light source 10 emits light (e.g., white light) spreading in a first direction D1 and a second direction D2 perpendicular to each other, from an optical axis. The light distribution angle is, for example, 120 to 130 degrees. Multiple light sources 10 are arranged in rows and columns. One group of Light sources 10 is aligned in the second direction. The multiple light sources 10 include multiple groups of light sources 10. Each light source 10 is a point light source.

[First Cylindrical Lens]

The backlight includes a first cylindrical lens 12. The first cylindrical lens 12 overlaps with the light source 10 in the third direction D3, perpendicular to the first direction D1 and the second direction D2. Multiple first cylindrical lenses 12 are arranged parallel to each other in the first direction D11.

The multiple first cylindrical lenses 12 overlap with the multiple light sources 10. A surface of the first cylindrical lens 12, facing the light source 10, is flat. One group of light sources 10 overlaps with a corresponding one of the multiple first cylindrical lenses 12.

The first cylindrical lens 12 has a convex surface that refracts light. A surface opposite to the light source 10 is the convex surface. The convex surface is shaped by rotating a straight line, extending in the second direction D2, around an axis in the second direction D2. The first cylindrical lens 12 refracts and brings the light closer along the first direction D1 to the optical axis. The light distribution angle of the refracted light is within 30 degrees.

[Second Cylindrical Lens]

The backlight includes a second cylindrical lens 14. The second cylindrical lens 14 overlaps with the light source 10 and the first cylindrical lens 12 in the third direction D3. The multiple light sources 10 overlap with multiple second cylindrical lenses 14. Each second cylindrical lens 14 overlaps with a corresponding one of the multiple first cylindrical lenses 12. One group of light sources 10 overlaps with a corresponding one of the multiple second cylindrical lenses 14.

The second cylindrical lens 14 has a convex surface that refracts light. The convex surface is shaped by rotating a straight line, extending in the second direction D2, around an axis in the second direction D2. The second cylindrical lens 14 refracts and brings the light even closer in the first direction D1 to the optical axis. The light distribution angle of the refracted light is within three degrees.

[Reflector]

The backlight includes a reflector 16. The reflector 16 extends in the first direction D1. Multiple reflectors 16 are arranged parallel to each other in the second direction D2. The reflector 16 overlaps with the multiple first cylindrical lenses 12 and the multiple second cylindrical lenses 14.

The reflector 16 is positioned between the first cylindrical lens 12 and the second cylindrical lens 14, in the third direction D3. The reflector 16 has a concave surface 18 facing the convex surface of the first cylindrical lens 12. This allows a lower end of the reflector 16 to be brought closer to, or preferably aligned with, a lower end of the convex surface of the first cylindrical lens 12.

The reflector 16 avoids overlap with the light source 10 in the third direction D3. Each light source 10 is positioned between an adjacent Pair of the multiple reflectors 16. A pair of reflectors 16 are positioned on both sides of the light source 10 in the second direction D2.

The reflector 16 includes a main body 20 and a surface layer 22, with the surface layer 22 being light-reflective. The concave surface 18 does not necessarily have to be light-reflective. The reflector 16 has a reflective surface 24 of light A surface of the surface layer 22 is the reflecting surface 24. The reflective surface 24 is parallel to the first direction D1 and intersects obliquely with the second direction D2 and the third direction D3. Light from the light source 10 passes through the first cylindrical lens 12 and is reflected on the reflective surface 24. The reflective surface 24 reflects and brings the light closer in the second direction D2 to the optical axis. The light distribution angle of the reflected light is within 30 degrees.

According to this embodiment, the light distribution angle can be narrowed without using a spherical lens. The light distribution angle is within three degrees in the first direction D1 and within 30 degrees in the second direction D2, whereby the light distribution from each light source 10 forms an elongated ellipse in the second direction D2. The light distribution from adjacent light sources 10 in the second direction D2 is continuous. This can create multiple linear light distribution regions 26, each extending in the second direction D2.

[Display Device]

Figure 4:
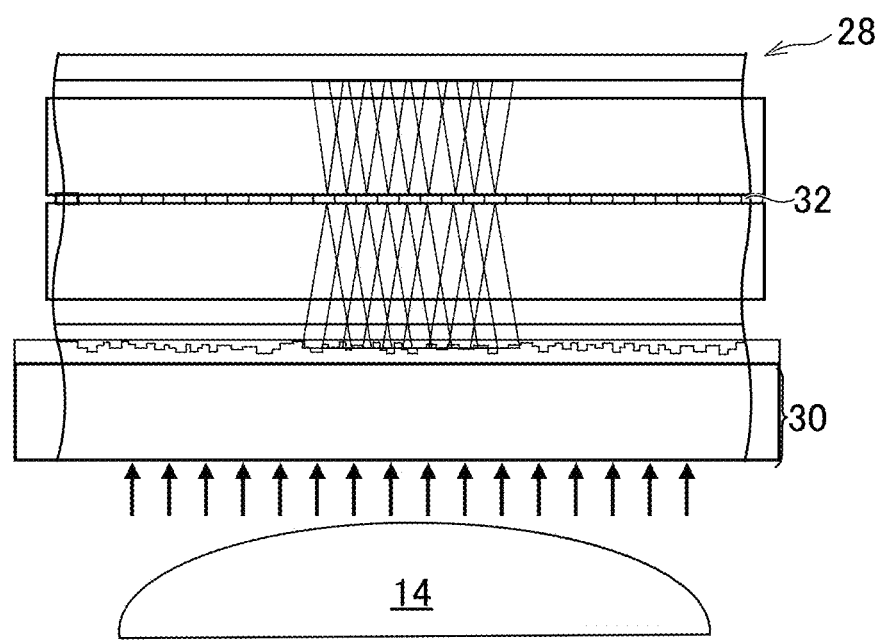
FIG. 4 is a schematic sectional view of a display device according to the embodiment.

FIG. 4 is a schematic sectional view of a display device according to the embodiment. The display device includes the aforementioned backlight. Note that only the second cylindrical lens 14 is shown in FIG. 4.

The display device includes a transmissive display panel 28. Light enters the display panel 28 from the second cylindrical lens 14. The light distribution angle is small particularly in the first direction D1. The light is white. Specifically, the light entering the display panel 28 includes red light, green light, and blue light.

The display panel 28 includes a color separation unit 30. On a surface of a substrate of the color separation unit 30, color separation grooves are formed by protrusions and depressions in a predetermined pattern. This diffracts white light in the first direction D1 and separates it into its RGB wavelength components. The separated light further passes through a color filter 32. Thus, red light, green light, and blue light are obtained, and the display panel 28 displays full-color images using optical properties of liquid crystals.

The embodiments described above are not limited and different variations are possible. The structures explained in the embodiments may be replaced with substantially the same structures and other structures that can achieve the same effect or the same objective.

What is claimed is:

1. A backlight comprising:
   a light source capable of emitting light spreading in a first direction and a second direction perpendicular to each other, from an optical axis;
   a first cylindrical lens that refracts and brings the light closer along the first direction to the optical axis, the first cylindrical lens overlapping with the light source in a third direction perpendicular to the first direction and the second direction;
   a second cylindrical lens that refracts and brings the light even closer along the first direction to the optical axis, the second cylindrical lens overlapping with the light source and the first cylindrical lens in the third direction; and
   a reflector that reflects and brings the light closer along the second direction to the optical axis, the reflector being positioned between the first cylindrical lens and the second cylindrical lens in the third direction, the reflector avoiding overlap with the light source.

2. The backlight according to claim 1, wherein each of the first cylindrical lens and the second cylindrical lens has a convex surface that refracts the light, the convex surface being shaped by rotating a straight line, extending in the second direction, around an axis in the second direction.

3. The backlight according to claim 2, wherein the reflector has a concave surface facing the convex surface of the first cylindrical lens.

4. The backlight according to claim 1, wherein the reflector has a reflective surface of the light, the reflective surface being parallel to the first direction and intersecting obliquely with the second direction and the third direction.

5. The backlight according to claim 1, wherein the reflector includes a main body and a surface layer, the surface layer being light-reflective.

6. The backlight according to claim 1, wherein
   the first cylindrical lens includes multiple first cylindrical lenses,
   the second cylindrical lens includes multiple second cylindrical lenses, and
   each of the multiple first cylindrical lenses overlaps with a corresponding one of the multiple second cylindrical lenses.

7. The backlight according to claim 6, wherein the light source includes multiple light sources that overlap with the multiple first cylindrical lenses and the multiple second cylindrical lenses.

8. The backlight according to claim 7, wherein the multiple light sources include multiple groups of light sources, the light sources in each of the multiple groups overlapping with a corresponding one of the multiple first cylindrical lenses and a corresponding one of the multiple second cylindrical lenses.

9. The backlight according to claim 7, wherein the reflector includes multiple reflectors, each of the multiple light sources being positioned between an adjacent pair of the multiple reflectors.

10. The backlight according to claim 6, wherein the reflector extends in the first direction and overlaps with the multiple first cylindrical lenses and the multiple second cylindrical lenses.

11. The backlight according to claim 1, wherein the reflector includes a pair of reflectors, the pair of reflectors being positioned on both sides of the light source in the second direction.

12. A display device comprising the backlight according to claim 1, and a transmissive display panel.

* * * * *